(12) United States Patent
Grey et al.

(10) Patent No.: US 7,451,358 B2
(45) Date of Patent: Nov. 11, 2008

(54) TEST EXECUTIVE SYSTEM WITH AUTOMATIC EXPRESSION LOGGING AND PARAMETER LOGGING

(75) Inventors: James A. Grey, Austin, TX (US); Hjalmar Perez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 567 days.

(21) Appl. No.: 11/101,326

(22) Filed: Apr. 7, 2005

(65) Prior Publication Data

US 2006/0230318 A1 Oct. 12, 2006

(51) Int. Cl.
*G06F 11/00* (2006.01)
(52) U.S. Cl. .......................... 714/45; 714/46
(58) Field of Classification Search ............ 714/45, 714/46; 702/187
See application file for complete search history.

(56) References Cited

U.S. PATENT DOCUMENTS

| | | | |
|---|---|---|---|
| 5,210,859 A * | 5/1993 | Aoshima et al. ............. 714/46 |
| 6,397,378 B1 * | 5/2002 | Grey et al. ................. 717/175 |
| 6,401,220 B1 | 6/2002 | Grey et al. |
| 6,539,501 B1 * | 3/2003 | Edwards .................... 714/45 |
| 6,732,296 B1 | 5/2004 | Cherney et al. |
| 6,868,508 B2 | 3/2005 | Grey et al. |
| 7,050,921 B2 | 5/2006 | Sutton |
| 7,055,138 B2 | 5/2006 | Sutton |
| 2005/0246390 A1 * | 11/2005 | House et al. ............... 707/200 |
| 2005/0268171 A1 | 12/2005 | House et al. |
| 2006/0036392 A1 | 2/2006 | Fay |
| 2006/0136876 A1 | 6/2006 | Melamed et al. |
| 2006/0143527 A1 | 6/2006 | Grey |
| 2006/0143536 A1 | 6/2006 | Grey |
| 2006/0143537 A1 | 6/2006 | Grey |

OTHER PUBLICATIONS

Prior Art Statement; 1 page.

* cited by examiner

*Primary Examiner*—Gabriel L Chu
(74) *Attorney, Agent, or Firm*—Meyertons Hood Kivlin Kowert & Goetzel, P.C.; Jeffrey C. Hood; Jason L. Burgess

(57) ABSTRACT

A test executive sequence may be created by including a plurality of test executive steps in the test executive sequence in response to user input to a sequence editor. At least a subset of the test executive steps in the test executive sequence may be configured to call user-supplied code modules. In one embodiment, one or more expressions may be configured for one or more steps in the test executive sequence, where the one or more expressions evaluate to result values to be logged when the step is executed during execution of the test executive sequence. In another embodiment, one or more parameters of one or more user-supplied code modules called by steps in the test executive sequence may be configured to be logged when the test executive sequence is executed.

24 Claims, 11 Drawing Sheets

| Main | Setup | Cleanup | Parameters | Locals | View: | MainSequence | | |
|---|---|---|---|---|---|---|---|---|
| Step | | | Description | | | | Execution Flow | Comment |
| Power On | | | Numeric Limit Test, 12 <= x <= 15, volt, Call P… | | | | Precondition | |
| CPU | | | Call MainSequence in cpu.seq | | | | | |
| ROM | | | Pass/Fail Test, Call ROMTest (computer.dll) | | | | Precondition | |
| RAM | | | Pass/Fail Test, Call RAMTest (computer.dll) | | | | Precondition | |
| Video | | | Numeric Limit Test, 70 <= x <= 75, hertz, Call … | | | | Precondition | |
| Keyboard | | | Pass/Fail Test, Call KeyboardTest (computer.dll) | | | | Precondition | |
| ROM Diagnostics | | | Action, Call ROMDiagnostics (computer.dll) | | | | Precondition | |
| RAM Diagnostics | | | Action, Call RAMDiagnostics (computer.dll) | | | | Precondition | |
| Video Diagnostics | | | Action, Call VideoDiagnostics (computer.dll) | | | | Precondition | |
| Keyboard Diagnostics | | | Action, Call KeyboardDiagnostics (computer.dll) | | | | Precondition | |
| END | | | | | | | | |

No Steps Selected | Number of Steps: 10

| Name | Type | In/Out | Default | Value |
|---|---|---|---|---|
| Sequence Context | Object Reference | in | | ThisContext |
| Report Text | ASCII String | out | | |
| ⊟ error out | Container | out | | Step.Result.Error |
| status | Boolean | out | | Step.Result.Error.Occurred |
| code | Number (I32) | out | | Step.Result.Error.Code |
| source | ASCII String | out | | Step.Result.Error.Msg |

FIG. 10

TEST EXECUTIVE SYSTEM WITH AUTOMATIC EXPRESSION LOGGING AND PARAMETER LOGGING

FIELD OF THE INVENTION

The present invention relates to the field of test executive software for organizing and executing test executive sequences. In particular, the invention relates to a system and method for enabling users to configure results of steps in a test executive sequence to be logged and/or to configure parameters of user-supplied code modules called by steps in the test executive sequence to be logged.

DESCRIPTION OF THE RELATED ART

Test executive software is specialized software that allows a user to create and execute test executive sequences to test units under test (UUTs). The test executive software operates as a control center for an automated test system. More specifically, the test executive software allows the user to create, configure, and control execution of test executive sequences for various test applications, such as production and manufacturing test applications. Text executive software typically includes various features such as test sequencing based on pass/fail results, logging of test results, and test report generation, among others.

A test executive sequence may include a plurality of steps, and one or more of the steps may call user-supplied code modules, also referred to herein as test modules. As used herein, a user-supplied code module or test module refers to a software module that is written or supplied by a user of the test executive software. The user may construct various test modules designed to perform tests on a UUT, and execution of these test modules may be invoked by steps in a test executive sequence when the sequence is executed. For example, the test modules may interact with one or more hardware instruments to test the UUT(s).

The test executive software typically includes a sequence editor for creating test executive sequences and a test executive engine operable to execute the test executive sequences. Executing a test executive sequence may comprise executing each of the steps in the test executive sequence, e.g., executing each of the steps according to an order defined by the test executive sequence.

For each step in the test executive sequence that calls a user-supplied code module, executing the step may comprise both executing program instructions of the test executive engine and executing the user-supplied code module. For example, in addition to calling a user-supplied code module, a step in a test executive sequence may also perform additional functionality, where the additional functionality is implemented by the test executive engine and not coded by the user. For example, the step may be operable to perform common functionality which is useful for various automated test applications, where the common functionality is implemented by the test executive engine. This may remove the burden on the user from implementing this functionality for the step, thus increasing the user's ease and efficiency of creating the automated test system.

In some instances a test executive sequence may also include one or more steps that do not call user-supplied code modules. For example, the functionality of some steps may be implemented entirely by the test executive engine and may not be coded by the user. However, the test executive software, e.g., the sequence editor, may allow the user to set various properties affecting operation of the steps, e.g., by interacting with a dialog box or other graphical user interface associated with the steps.

One important aspect of executing a test executive sequence is result logging or report generation. For example, test results generated during execution of the test executive sequence may need to be logged so that they can be reviewed later. It would be desirable to provide a test executive system that allows users to easily configure the logging of execution results and also utilizes a logging technique that is flexible enough to configure the logging of various kinds of data associated with the test executive sequence execution, where the data may have any of various data types.

The user-supplied code modules that are called by steps of a test executive sequence may generate data that needs to be logged. In addition, it is often useful to log the values of input parameters that are passed to the user-supplied code modules or the values of output parameters written by user-supplied code modules. For example, logging the parameter values may enable the user to better understand the test results. Thus, it would also be desirable to provide a test executive system operable to automatically log parameter values passed to user-supplied code modules.

SUMMARY

One embodiment of the invention comprises a system and method for logging data associated with execution of a test executive sequence. A test executive sequence may first be created, e.g., by including a plurality of test executive steps in the test executive sequence in response to user input to a sequence editor. At least a subset of the test executive steps in the test executive sequence may be configured to call user-supplied code modules. For example, for each step that calls a user-supplied code module, the user may interact with a GUI panel or provide other input to the sequence editor to specify or select the user-supplied code module to call.

For each test executive step in at least a subset of the test executive steps in the test executive sequence, one or more expressions may be configured for the step, where the one or more expressions evaluate to result values to be logged when the step is executed during execution of the test executive sequence. As used herein, an "expression" may comprise any character string or combination of symbols which produces a result value when evaluated.

For example, for each step where the user desires data to be logged, the user may interact with the sequence editor to associate one or more expressions with the step, where the one or more expressions evaluate to the data (result values) which the user desires to be logged. The test executive sequence may later be executed under control of a test executive engine, and the test executive engine may be operable to evaluate the expressions associated with each step in the test executive sequence and log the result values produced by the expressions.

The above-described method may simplify the user's task of developing a test executive sequence to test a UUT and logging test results or other execution results of the test executive sequence. The user may configure one or more expressions for one or more steps of the test executive sequence to be automatically logged without having to do any programming to implement the logging, other than simply specifying the expressions themselves. For example, the user may simply interact with a graphical user interface of the sequence editor to specify the expressions to be logged, and the test executive engine may automatically evaluate the expressions and log their result values when the test executive sequence is executed. The graphical user interface may allow the user to easily configure any number of expressions to log, where the expressions evaluate to data having any of various data types.

Another embodiment of the invention comprises a system and method for logging parameters of user-supplied code modules called by steps of a test executive sequence. A test executive sequence may first be created, e.g., by including a plurality of test executive steps in the test executive sequence in response to user input to a sequence editor. At least a subset of the test executive steps in the test executive sequence may be configured to call user-supplied code modules. For example, for each step that calls a user-supplied code module, the user may interact with a GUI panel or provide other input to the sequence editor to specify or select the user-supplied code module to call.

Each of the user-supplied code modules that are called by steps of the test executive sequence may take parameters of various data types. Thus, configuring a test executive step to call a user-supplied code module may also comprise specifying what to pass for each parameter of the user-supplied code module. Parameters for a user-supplied code module may include input parameters and/or output parameters. An input parameter may provide input to the user-supplied code module, and an output parameter may be written into by the user-supplied code module.

For example, for each input parameter, the user may specify a variable, constant, or other data to be passed as the parameter value. When the step is executed during execution of the test executive sequence, the user-supplied code module referenced by the step may be invoked with the specified parameter values. Similarly, for each output parameter, the user may specify a memory location (e.g., a variable, property, or other memory location or address) into which the user-supplied code module can write data for the output parameter. When the step is executed during execution of the test executive sequence, the user-supplied code module referenced by the step may execute to write data into the memory locations passed for the output parameters.

For each test executive step in at least a subset of the test executive steps that call user-supplied code modules, one or more parameters of the user-supplied code module called by the test executive step may be configured to be logged when the test executive step is executed. For example, the user may provide input to the sequence editor to select or specify one or more parameters of one or more user-supplied code modules called by steps in the test executive sequence, and the sequence editor may configure the parameters selected by the user to be logged.

For each test executive step that calls a user-supplied code module for which one or more parameters are configured to be logged, the one or more parameters may be logged or stored when the test executive step is executed during execution of the test executive sequence. For example, input parameters may be logged by storing the actual parameter values passed to the user-supplied code module, e.g., in a file or database. Output parameters may be logged by storing the data written into the parameter locations by the user-supplied code module. As described below, the test executive sequence may be executed under control of a test executive engine, and the test executive engine may be operable to log the parameters that are configured to be logged for the various user-supplied code modules called by steps of the test executive sequence.

The above-described method may simplify the user's task of developing a test executive sequence to test a UUT and evaluating test results of the test executive sequence. The user may configure one or more parameters of one or more user-supplied code modules called by steps of the test executive sequence to be automatically logged without having to do any programming to implement the logging. For example, the user may simply interact with a graphical user interface of the sequence editor to select the parameters to be logged, and the test executive engine may automatically log the selected parameters when the test executive sequence is executed.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a sequence editor;

FIG. 7 illustrates one exemplary embodiment of a graphical user interface for configuring one or more expressions to be logged for a test executive step in a test executive sequence;

FIG. 10 illustrates one exemplary embodiment of a graphical user interface with which a user may interact to configure one or more parameters of a user-supplied code module to be logged.

Figure 1:
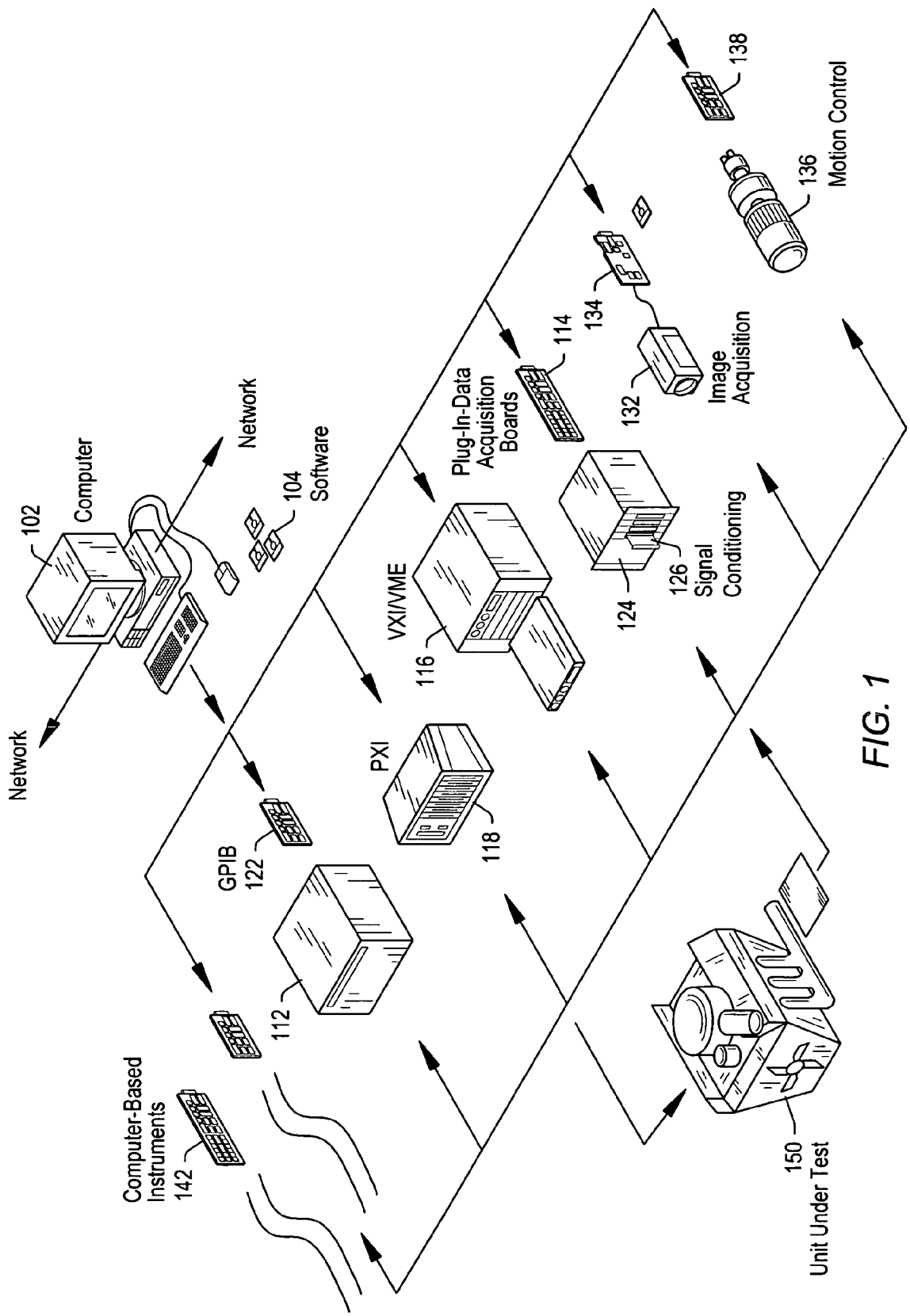
FIG. 1 illustrates an exemplary automated test system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein.

U.S. Pat. No. 6,401,220 titled "Test Executive System and Method Including Step Types for Improved Configurability," issued Jun. 4, 2002.

U.S. patent application Ser. No. 09/944,546 titled "System and Method Enabling Execution Stop and Restart of a Test Executive Sequence(s)," filed Aug. 31, 2001.

U.S. patent application Ser. No. 10/056,853 titled "Test Executive System Having XML Reporting Capabilities," filed Jan. 25, 2002.

*TestStand™ Reference Manual*, July 2003 Edition, published by National Instruments Corp.

*Using TestStand™ manual*, July 2003 Edition, published by National Instruments Corp.

Terms

The following is a glossary of terms used in the present application:

User-Supplied Code Module—A software module or component written by a user. A user-supplied code module may be constructed or packaged in any of various ways and may be created using any of various programming tools or application development environments. For example, a user-supplied code module may be implemented as a function in a Windows Dynamic Link Library (DLL), a LabVIEW graphical program (VI), an ActiveX component, a Java component, or other type of program module or component that implements a specific test or other functionality.

Test Module—A user-supplied code module that performs a test of a UUT.

Test Executive Step—An action that the user can include within a test executive sequence. A step may call a user-supplied code module, e.g., may call a test module to perform a specific test of a UUT. The step may have properties that can be set by the user, e.g., through a dialog box or other graphical user interface. In addition to calling a user-supplied code module, a step may also have built-in functionality implemented by the test executive software.

Step Module—The user-supplied code module that a test executive step calls.

Test Executive Sequence—A plurality of test executive steps that the user specifies for execution in a particular order. Whether and when a step is executed can depend on the results of previous steps. A test executive sequence may be created using a sequence editor. For example, the sequence editor may create a sequence file or other data structure representing the test executive sequence. A test executive sequence may be executed by a test executive engine.

Sequence File—A file that contains the definition of one or more test executive sequences.

Sequence Editor—A program that provides a graphical user interface for creating, editing, and debugging sequences. One embodiment of a sequence editor is described in detail below.

Test Executive Engine—A program operable to execute a test executive sequence. One embodiment of a test executive engine is described in detail below.

Run-time Operator Interface Application—An application program that provides a graphical user interface for controlling execution of test executive sequences, e.g., on a production station. For example, the graphical user interface of the run-time operator interface application may allow a test operator to start and stop execution of the test executive sequences. A sequence editor and run-time operator interface application can be separate programs or different aspects of the same program. The test executive engine may provide an application programming interface (API) which the run-time operator interface application calls to control execution of the test executive sequences.

Application Development Environment (ADE)—A programming environment such as LabVIEW, LabWindows/CVI, Microsoft Visual C++, Microsoft Visual Basic, etc., in which a user can create user-supplied code modules and run-time operator interface applications.

Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Instrumentation System

FIG. 1 illustrates an exemplary automated test system 100, according to one embodiment. It is noted that FIG. 1 is exemplary only, and the present invention may be used in conjunction with any of various systems, as desired. The system 100 comprises a host computer 102 that connects to one or more instruments. The host computer 102 comprises a CPU, a display screen, memory, and one or more input devices such as a mouse or keyboard as shown.

The computer 102 may execute a test executive sequence operable to analyze, measure, control, or otherwise test a unit under test (UUT) or process 150. For example, the test executive sequence may include various steps that invoke software test modules operable to connect through the one or more instruments to analyze, measure, or control the unit under test (UUT) or process 150. The software test modules that are invoked or called by the steps in the test executive sequence may comprise user-supplied code modules. In other words, the test modules may be written or supplied by a user of the test executive software.

In one embodiment the user (e.g., creator of the test executive sequence) may configure one or more expressions to be evaluated during execution of the test executive sequence. The one or more expressions may evaluate to data, such as test module results or other values, which the user desires to be automatically logged when the test executive sequence is executed, as described in detail below with reference to FIGS. 6-8.

In another embodiment the user may desire parameter values for test modules that are called by steps of the test executive sequence to be automatically logged when the test executive sequence is executed. In one embodiment the user may select or specify the one or more parameters that are to be logged by interacting with a graphical user interface, as described in detail below with reference to FIGS. 9-11.

The test executive software may include a test executive engine 220 operable to execute the test executive sequence. The test executive engine 220 may be operable to control execution of each step in the test executive sequence and may automatically log the expression values and/or parameter values specified by the user, as described below.

Referring again to FIG. 1, the one or more instruments of the automated test system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the automated test system 100, as desired.

The computer 102 may include or may access a memory medium on which test executive software is stored. For example, the test executive software may include a test executive engine 220 which is operable to execute test executive sequences. The test executive software may also include components operable to create and configure test executive sequences, as described below. For example, the memory medium may store a sequence editor 212 such as described below. In one embodiment the memory medium may also store one or more test executive sequences to be executed on the computer 102, as well as possibly storing one or more user-supplied code modules called by steps in the test executive sequences. In one embodiment, one or more of the software elements described above may be included on remote computer systems.

Figure 2:
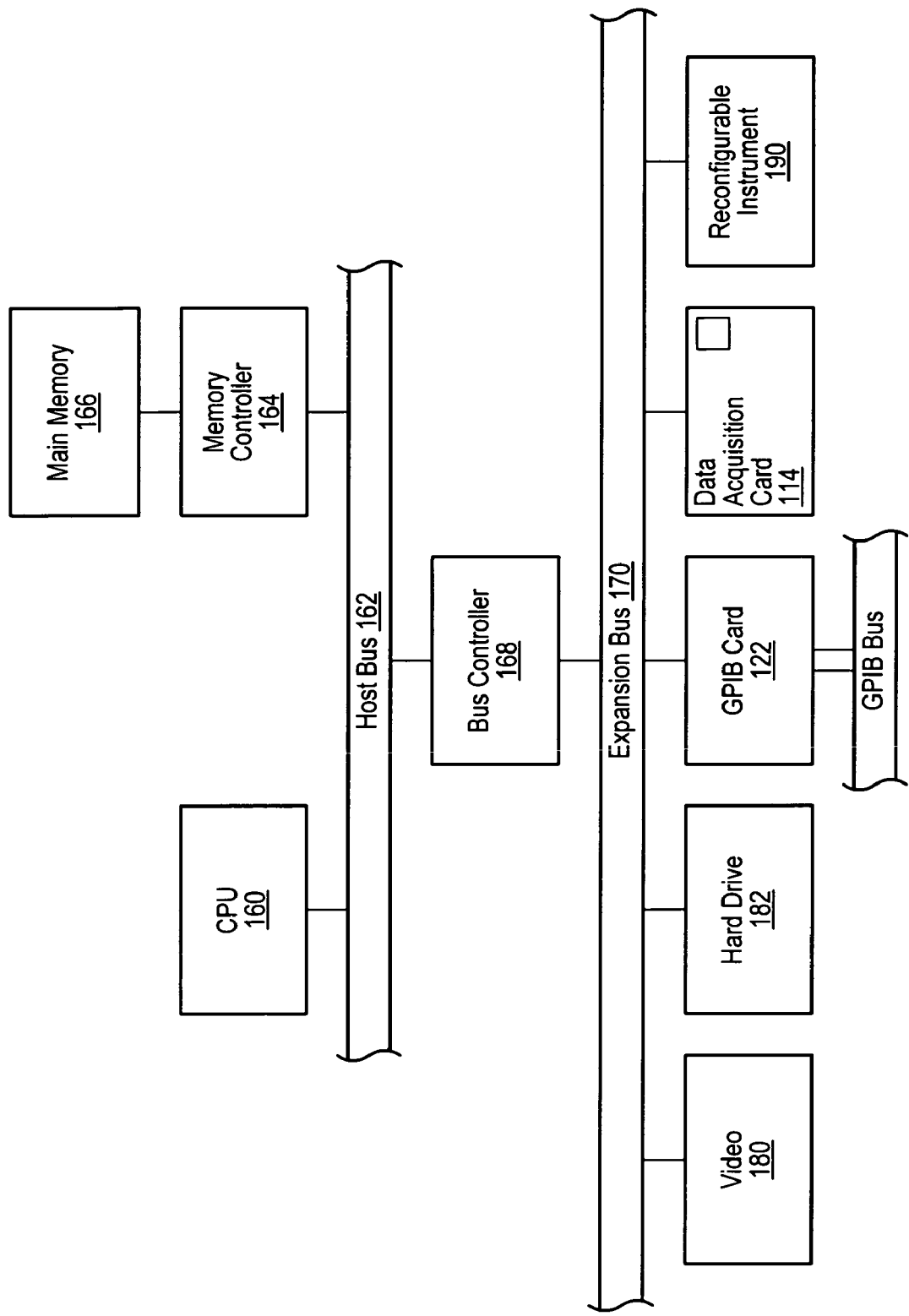
FIG. 2 is a diagram representing one embodiment of the computer system illustrated in FIG. 1.

FIG. 2—Computer System Block Diagram

FIG. 2 is a diagram of the computer system 102 illustrated in FIG. 1, according to one embodiment. It is noted that any type of computer system configuration or architecture can be used as desired, and FIG. 2 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

In the illustrated embodiment, the computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as the software elements described above with reference to FIG. 1. The main memory 166 may also store operating system software as well as other software for operation of the computer system, as well known to those skilled in the art. The CPU 160 executing code and data from the main memory. 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic element, e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Test Executive Software Components

Figure 3:
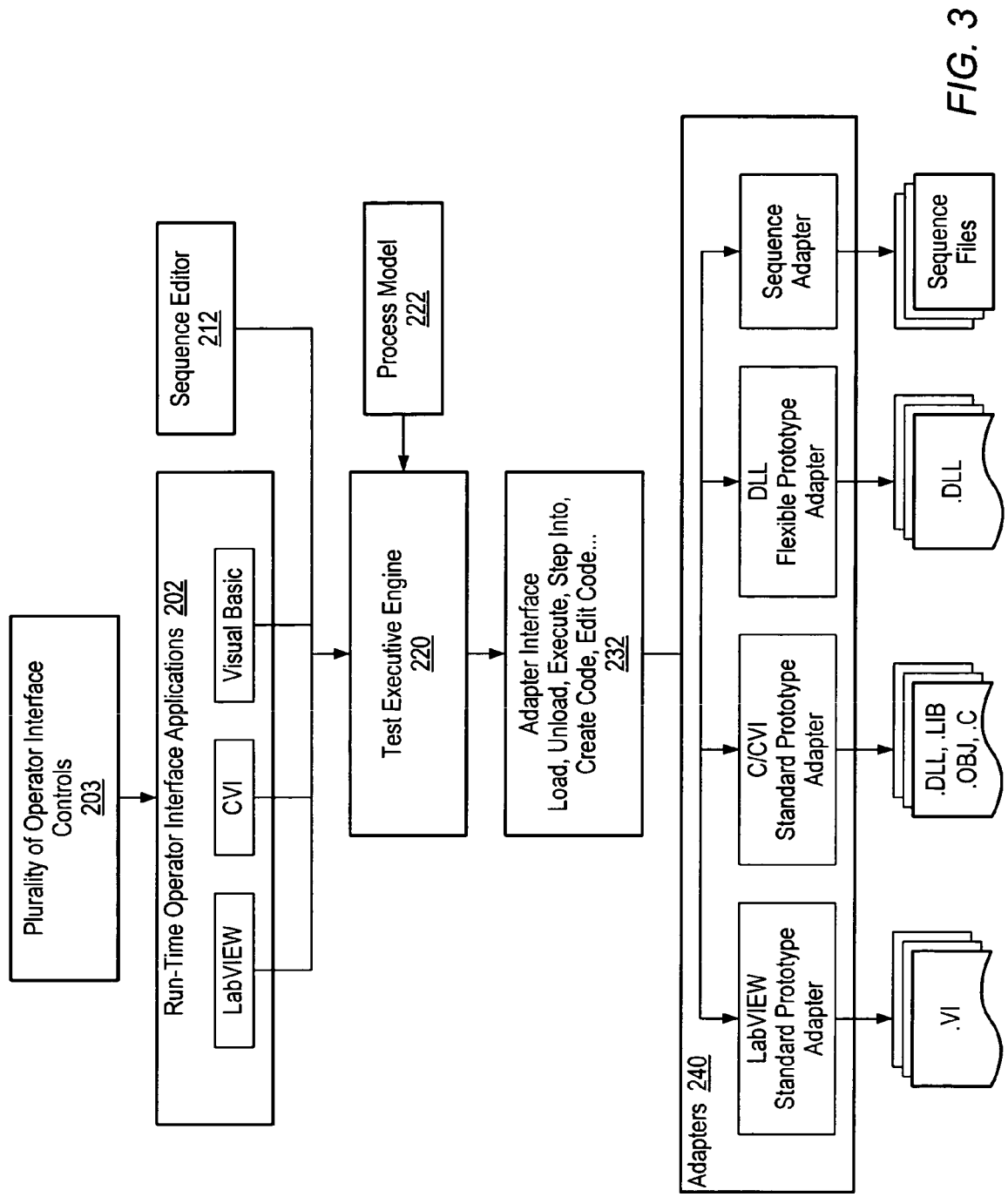
FIG. 3 is a diagram illustrating high-level architectural relationships between elements of a test executive software application according to one embodiment.

FIG. 3 is a block diagram illustrating high-level architectural relationships between elements of a test executive software application according to one embodiment. It is noted that FIG. 3 is exemplary, and in other embodiments the test executive software may have different architectures.

In the embodiment illustrated in FIG. 3, the test executive software includes a sequence editor 212 for creating and editing test executive sequences. The sequence editor 212 may interface to a test executive engine 220. In one embodiment, one or more process models 222 may couple to the test executive engine 220. The test executive engine 220 may interface through an adapter interface 232 to one or more adapters 240. The adapters 240 shown in FIG. 3 include a LabVIEW standard prototype adapter, a C/CVI prototype adapter, a DLL flexible prototype adapter, and a sequence adapter. The LabVIEW standard prototype adapter may interface to user-supplied code modules having a VI extension, i.e., LabVIEW graphical programs. The C/CVI prototype adapter may interface to user-supplied code modules having a .dll, .lib, .obj, or .c extension. The DLL flexible prototype adapter may interface to user-supplied code modules having a .dll extension. The sequence adapter may interface to sequence files.

The test executive engine 220 may manage the execution of test executive sequences. Test executive sequences include test executive steps that may call external or user-supplied code modules. By using module adapters 240 that have the standard adapter interface 232, the test executive engine 220 may invoke execution of different types of user-supplied code modules. Thus, the test executive may be independent from particular application development environments (ADEs) used to create the user-supplied code modules. In one embodiment, the test executive may use a special type of sequence called a process model to direct the high-level sequence flow. The test executive engine 220 may implement an application programming interface (API) used by the sequence editor 212 and run-time operator interfaces 202.

Sequence Editor

The sequence editor 212 may comprise a program in which the user creates, edits, and/or debugs test executive sequences. The sequence editor 212 may have a graphical user interface (GUI) enabling a user to efficiently create a test executive sequence for testing a physical system or unit under test. The graphical user interface of the sequence editor 212 may enable the user to request or select steps to be added to a test executive sequence and configure the steps. For example, the graphical user interface of the sequence editor 212 may enable the user to select user-supplied code modules to be called by steps in the test executive sequence. For example, the user may configure a step in the test executive sequence to call a user-supplied code module by browsing to and selecting a file (and possibly a module or function within the file) representing the user-supplied code module. The graphical user interface may also provide the user with easy access to test executive features, such as step types, step properties, sequence variables, step result collection, etc.

FIG. 4 illustrates one example of a test executive sequence, created according to one embodiment of a sequence editor 212. The exemplary test executive sequence of FIG. 4 includes a plurality of test executive steps that call user-supplied code modules operable to test various aspects of a computer system under test. For example, the sequence includes a "ROM" step that calls a user-supplied code module to test the computer's read-only memory, a "RAM" step that calls a user-supplied code module to test the computer's random access memory, etc. Each user-supplied code module called by a step in the test executive sequence may interact with one or more hardware devices or instruments that interface with the computer system under test to perform the desired test.

Figure 5:
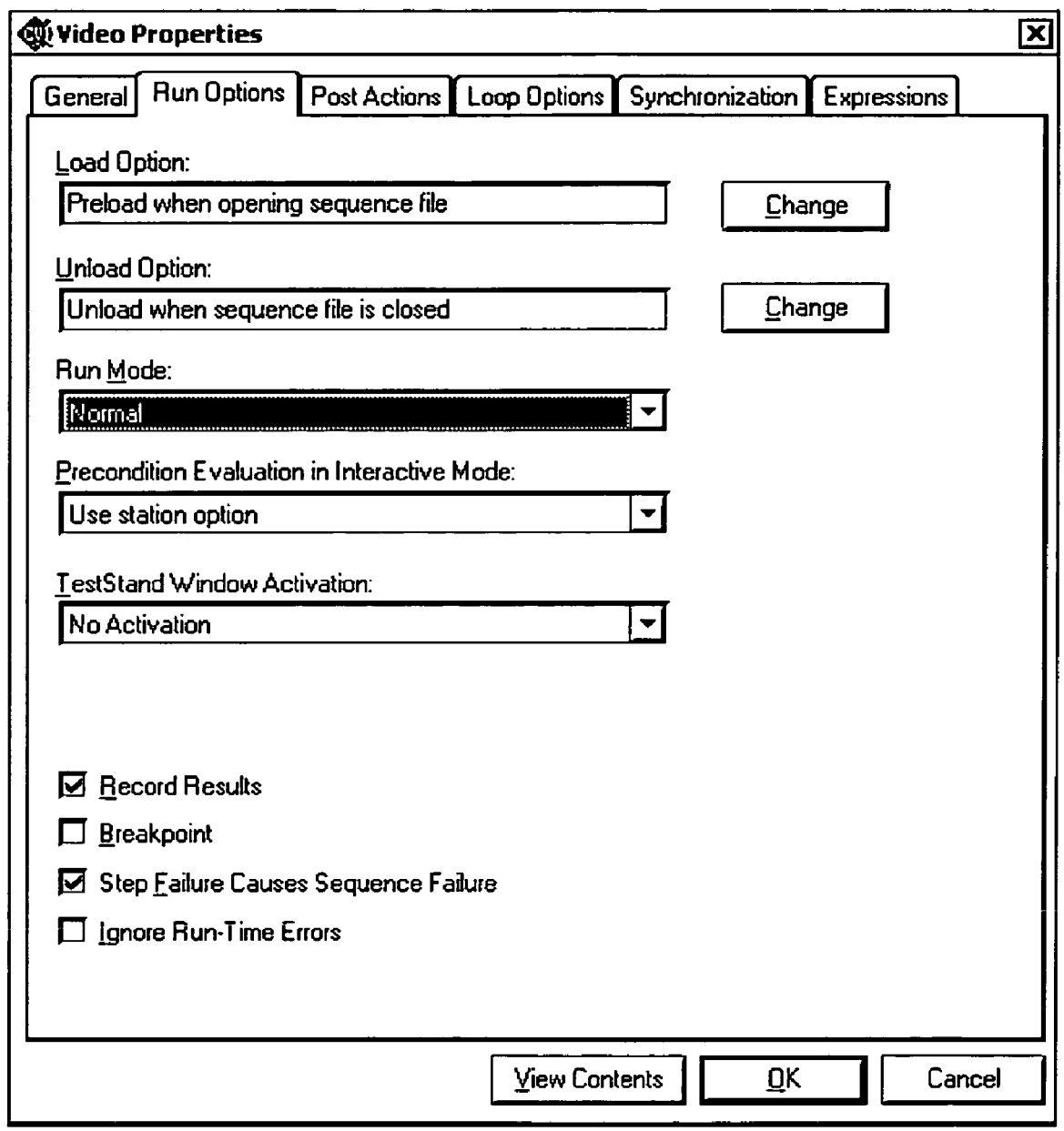
FIG. 5 illustrates an exemplary GUI panel for a test executive step, which enables the user to specify various options for the step that affect the way the test executive engine manages the execution of the step.

The user may be able to set various properties or parameters for each step that affect the way the test executive engine 220 manages the execution of the step. For example, the sequence editor 212 may provide a dialog box or other graphical user interface for each step with which the user may interact to specify the properties or parameters for the step. For example, FIG. 5 illustrates an exemplary dialog box for the "Video" step of the test executive sequence of FIG. 4. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc. Other property pages in the dialog box of FIG. 5, such as the "General", "Post Actions", "Loop Options", "Synchronization", and "Expressions" pages, enable the user to specify other options or properties for the step.

In one embodiment the sequence editor 212 may provide a graphical user interface allowing the user to configure execution results or other data to be logged during execution of a test executive sequence. As described in detail below, in one embodiment the graphical user interface may allow the user to specify one or more expressions to be evaluated during execution of the test executive sequence, where the one or more expressions evaluate to the desired data to be logged. Also, in one embodiment the sequence editor 212 may provide a graphical user interface allowing the user to select user-supplied code module parameters to be logged during execution of the test executive sequence.

In one embodiment, the sequence editor 212 may also include an execution window that provides debugging tools for debugging test executive sequences. For example, the test executive application may provide debugging features such as breakpoints, single stepping, tracing, a variable display, and a watch window.

Test Executive Engine

The test executive engine 220 may be used when executing and debugging test executive sequences. The test executive engine 220 may also provide a test executive engine application programming interface (API) that enables another program to interface with the test executive engine 220 in order to perform these actions. For example, a run-time operator interface application may request the test executive engine 220 to execute a test executive sequence, stop execution of the test executive sequence, etc.

In one embodiment, the test executive engine 220 may export an object-based or component-based API, which in one embodiment may be an ActiveX Automation API. The sequence editor 212 and run-time operator interface applications 202 may call the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from run-time operator interface applications 202 or test modules written in various programming environments, including those that are written in LabVIEW, LabWindows/CVI, Microsoft Visual C++, Microsoft Visual Basic, Java, etc.

One task performed by the test executive engine 220 is to manage the execution of test executive sequences. Executing a test executive sequence may comprise executing steps included in the test executive sequence. Not all steps in the test executive sequence are necessarily executed. For example, the user may configure some steps to be skipped, e.g., depending on execution results of previous steps.

For a step that calls a user-supplied code module, executing the step may comprise invoking execution of the respective code module. As described above, the user-supplied code module may be constructed in various ways, using any of various kinds of programming languages or application development environments. The user-supplied code module may execute independently from the test executive engine 220 and may possibly be executed under control of its own execution environment or subsystem.

In addition to these user-supplied code modules being executed, for each step, additional program instructions may be executed, wherein these additional program instructions are implemented by the test executive engine 220 itself and provide additional functionality for the step. In other words, these additional program instructions may be program instructions of the test executive software, e.g., program instructions of the test executive engine 220, rather than being defined by the user.

For example, in one embodiment the user may interact with a graphical user interface of the sequence editor 212 to associate one or more expressions with a step in the test executive sequence, where the expression(s) evaluate to test results or other data which the user desires to be logged when the step is executed. When the step is executed, program instructions of the test executive engine 220 that are operable to evaluate the expression(s) and log or store the resulting values may be executed in addition to the program instructions of a user-supplied code module that the step references. Thus, the test executive engine 220 may provide built-in functionality for logging test results or other data during execution of the test executive sequence so that the user does not have to write program code to implement this functionality.

As another example, in one embodiment the user may interact with a graphical user interface of the sequence editor 212 to select user-supplied code module parameters to be logged during execution of the test executive sequence. For example, the user may request that parameters of a user-supplied code module M be logged, where the user-supplied code module M is called by a step S in the test executive sequence. When the step S is executed, the test executive engine 220 may be operable to invoke execution of the module M, passing particular values for its parameters. The test executive engine 220 may also be operable to log or store the parameter values passed to the module M, as requested by the user. Thus, the test executive engine 220 may provide built-in functionality for logging user-supplied code module parameter values during execution of the test executive sequence so that the user does not have to write program code to implement this functionality.

In some instances, the additional program instructions that are implemented by the test executive engine 220 may be executed before a user-supplied code module called by the step is invoked. In this case, the functionality that is performed before the user-supplied code module is invoked may be referred to as "pre-functionality". In other instances, the additional program instructions that are implemented by the test executive engine 220 may be executed after the user-supplied code module called by the step finishes execution. In this case, the functionality that is performed after the user-supplied code module finishes execution may be referred to as "post-functionality". A step may have pre-functionality and/or post-functionality, or neither. The term "control functionality" may be used to collectively refer to the pre-functionality and post-functionality of a step.

It is noted that in one embodiment, not all steps of a test executive sequence must call a user-supplied code module. For example, the test executive software may provide some step types that primarily affect various aspects of sequence execution and are not designed to call user-supplied code modules.

Test Executive Steps

As described above, a test executive sequence comprises and defines an ordering for a plurality of test executive steps. A test executive step can do many things, such as initializing an instrument, performing a complex test, or making a decision that affects the flow of execution in a test executive sequence. Steps may perform these actions through several types of mechanisms, including jumping to another step, executing an expression, calling a sub-sequence, or calling a user-supplied code module.

Steps may have custom properties which the user can set, e.g., by interacting with a dialog box or other graphical user interface for the step as described above. For steps that call user-supplied code modules, custom step properties may be used to pass input parameter values to the user-supplied code module for the step. Custom step properties may also serve as locations for the user-supplied code module to store its results. For example, a custom step property may be passed as an output parameter to the user-supplied code module, and the user-supplied code module may write data into the output parameter. The test executive API may be used to access the values of custom step properties from user-supplied code modules.

As described above, in one embodiment not all steps call user-supplied code modules. Some steps may perform standard actions that the user configures using a GUI panel or dialog box. In this case, custom step properties may be useful for storing configuration settings that the user specifies.

Built-In Step Properties

As discussed above, in one embodiment test executive steps in a test executive sequence may have a number of built-in properties that the user can specify or configure. In one embodiment, built-in step properties may include properties such as:

"Preconditions" that allow the user to specify the conditions that must be true for the test executive engine 220 to execute the step during the normal flow of execution in a sequence.

"Load/Unload Options" that allow the user to specify when the test executive software loads and unloads the code modules or subsequences that each step invokes.

"Run Mode" that allows a step to be skipped or forced to pass or fail without executing the step module.

"Record Results" that allows the user to specify whether the test executive software collects the results of the step.

"Step Failure Causes Sequence Failure" that allows the user to specify whether the test executive software sets the status of the test executive sequence to "Failed" when the status of the step is "Failed".

"Ignore Run-Time Errors" that allows the user to specify whether the test executive sequence continues execution normally after the step even though a run-time error occurs in the step.

"Post Actions" that allows the user to specify the execution of callbacks or jump to other steps after executing the step, depending on the pass/fail status of the step or any custom condition.

"Loop" options that cause a single step to execute multiple times before executing the next step. The user can specify the conditions under which to terminate the loop. The user can also specify whether to collect results for each loop iteration, for the loop as a whole, or for both.

"Pre Expression" that allows the user to specify an expression to be evaluated before executing the step module.

"Post Expression" that allows the user to specify an expression to be evaluated after executing the step module.

"Status Expression" that allows the user to specify an expression to use to set the value of a "status" property of the step automatically.

Figure 6:
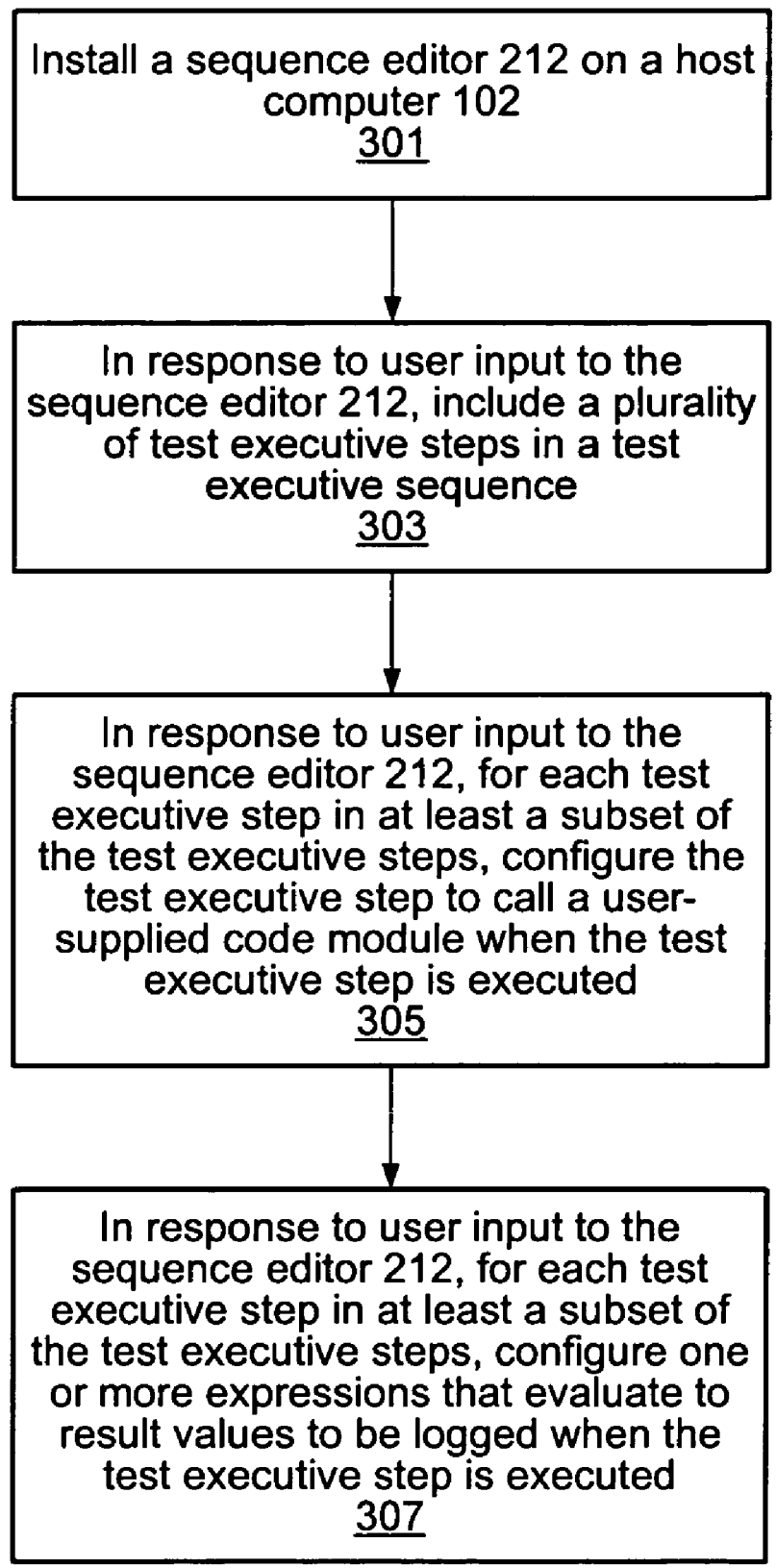
FIG. 6 is a flowchart diagram illustrating one embodiment of a method for creating a test executive sequence and associating one or more expressions with one or more test executive steps in the test executive sequence, where the expressions are to be evaluated and logged when the test executive sequence is executed.

FIG. 6—Configuring Expressions to Log for a Test Executive Sequence

FIG. 6 is a flowchart diagram illustrating one embodiment of a method for creating a test executive sequence and associating one or more expressions with one or more test executive steps in the test executive sequence, where the expressions are to be evaluated and logged when the test executive sequence is executed. It is noted that FIG. 6 illustrates a representative embodiment, and alternative embodiments are contemplated. Also, various elements may be combined, omitted, or performed in different orders.

In 301, a sequence editor 212 may be installed on a computer system, such as the host computer 102 described above. As used herein, installing the sequence editor 212 on a computer system may include enabling the computer system to execute the sequence editor 212. For example, one or more executable files associated with the sequence editor 212 or providing access to the sequence editor 212 may be installed on the host computer 102. In one embodiment the sequence editor 212 may be installed as part of a test executive application.

In 303, a test executive sequence may be created using the sequence editor 212 installed in 301. Creating the test executive sequence may comprise including a plurality of test executive steps in the test executive sequence in response to user input to the sequence editor 212, as described above. The user may also configure each of the test executive steps, e.g., by interacting with a GUI panel or dialog box for each step to set various properties.

In 305, at least a subset of the test executive steps in the test executive sequence may be configured to call user-supplied code modules. For example, for each step that calls a user-supplied code module, the user may interact with a GUI panel or provide other input to the sequence editor 212 to specify or select the user-supplied code module to call.

Each of the user-supplied code modules that are called by steps of the test executive sequence may take parameters of various data types. Thus, configuring a test executive step to call a user-supplied code module may also comprise specifying what data or address to pass for each parameter of the user-supplied code module. For example, for each parameter, the user may specify a variable, constant, or other data to be passed as the parameter value. Thus, when the step is executed during execution of the test executive sequence, the user-supplied code module referenced by the step may be invoked with the specified parameter values.

In various embodiments the test executive sequence may be operable to test any of various kinds of units under test (UUT) or physical systems. For example, test executive steps in the test executive sequence may call user-supplied code modules that are operable to connect through one or more hardware devices or instruments to analyze, measure, or control a unit under test (UUT) or process 150, such as described above with reference to FIG. 1.

In 307, for each test executive step in at least a subset of the test executive steps in the test executive sequence, one or more expressions may be configured for the step, where the one or more expressions evaluate to result values to be logged when the step is executed during execution of the test executive sequence. For example, for each step where the user desires data to be logged, the user may interact with the sequence editor 212 to associate one or more expressions with the step, where the one or more expressions evaluate to the data which the user desires to be logged. As described below, the test executive sequence may be executed under control of a test executive engine 220, and the test executive engine 220 may be operable to evaluate the expressions associated with each step in the test executive sequence and log the result values produced by the expressions.

As used herein, an "expression" may comprise any character string or combination of symbols which, when evaluated by the test executive engine 220, produces a result value. An expression includes at least one operand and may optionally have one or more operators. An operand may represent or refer to data, such as a variable, property, or constant. An operator may represent a particular action to be performed on one or more of the operands. For example, the expression "x" consists of only a single operand x, e.g., where x is a variable. In this example, the expression may simply evaluate to the value of the variable x. As another example, in the expression, "x+5", x and 5 are operands, and + is an operator. In this example, the expression may evaluate to the value of the variable x plus the constant 5 (assuming that the + operator has its usual mathematical meaning). An expression may also include parentheses or other symbols which indicate an order of evaluation for the operators. For example, in the expression, "y*(x+5)" the parentheses may indicate that x+5 is first evaluated to produce an intermediate result which is then multiplied by y.

In various embodiments the test executive engine 220 may be able to evaluate expressions that are constructed according to any syntax or notation and that include any of various kinds of operands or operators. Thus, the expressions that are configured for steps in the test executive sequence in 307 may be constructed according to the particular expression syntax or rules used by the test executive engine 220. For example, in one embodiment, valid expressions for the test executive engine 220 may include expressions that are valid in or based on a particular programming language.

As noted above, an expression that is configured for a step in the test executive sequence may include one or more variables or properties. In various embodiments the variables or properties used in the expression may be identified or referenced in any of various ways, e.g., according to the particular embodiment of the sequence editor 212 and test executive engine 220.

In one embodiment the sequence editor 212 may allow the user to define and the test executive engine 220 may be able to access variables that are local to the test executive sequence. In another embodiment the test executive engine 220 may be able to access variables that are not local to the test executive sequence, such as global variables that are accessible to multiple test executive sequences in a sequence file.

In one embodiment, user-supplied code modules that called by steps of a test executive sequence may be able to access test executive sequence variables. For example, a programming interface between the test executive engine 220 and the user-supplied code modules may be used such that sequence variables can be passed to or accessed by user-supplied code modules. Thus, for example, a user-supplied code module may perform a test of a UUT (or perform any of various other kinds of operations), and execution results of the test (or other operation) may be written into one or more variables defined by the test executive sequence.

Each expression that is configured for a test executive sequence step in the test executive sequence in 307 may be evaluated to produce data of any kind, e.g., according to the kinds of variables, properties, or operators used in the expression. For example, some expressions may evaluate to scalar values, where the scalar values can have any of various data types, such as integer values, floating point values, Boolean values, etc. Other expressions may evaluate to more complex values. For example, an expression that includes an array variable may evaluate to an array, where the array may include values that have any of various data types. As another example, an expression that includes a structure, record, or container variable (such as a "struct" variable in the C programming language) may evaluate to a structure, record, or container.

In various embodiments the user may interact with the sequence editor 212 in any of various ways to configure one or more expressions for one or more steps in the test executive sequence in 307. In one embodiment the user may interact with a graphical user interface to specify the desired expressions to be logged. For example, in one embodiment, for each step in the test executive sequence for which the user desires data to be logged, the user may interact with a graphical user interface to specify one or more expressions for the step, where the one or more expressions evaluate to the data to be logged when the step is executed during execution of the test executive sequence.

Figure 7:
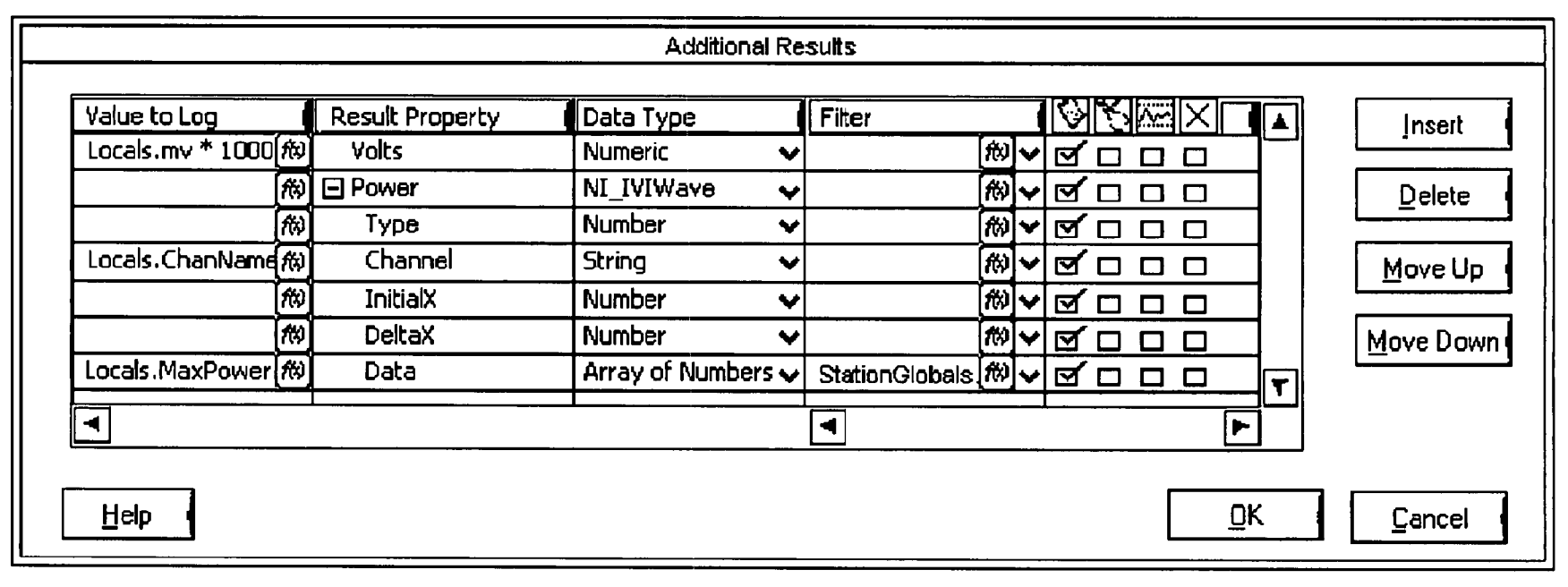

FIG. 7 illustrates one exemplary embodiment of a graphical user interface for configuring one or more expressions for a test executive step in a test executive sequence, where the expressions are to be evaluated and logged when the step is executed during execution of the test executive sequence. As shown, the graphical user interface includes a plurality of columns.

The "Value to Log" column specifies an expression to be evaluated and logged. The user may either type in the expression manually or may interact with an "Expression Browser" popup window which aids the user in creating an expression, e.g., by providing visual access to variables that are defined for the test executive sequence. The sequence editor 212 may be operable to validate the expressions entered in this column and inform the user if an invalid expression has been entered, such as an expression which does not conform to correct syntax or references undefined variables.

The "Result Property" column specifies a property to which the result value of the expression is written. In the embodiment illustrated in FIG. 7, the test executive sequence utilizes a results data structure which holds execution results for the test executive sequence, where the results data structure includes multiple properties. Thus, a property may be defined to hold the result value of each expression that the user configures for the step. Data from the results data structure may later be logged, e.g., by writing data from the data structure into a report file or database. The graphical user interface may assign default names for the properties so that the user does not have to enter a property name unless he wants to override the default. The graphical user interface may be operable to prevent the entry of an invalid or duplicative property name.

The "Data Type" column lets the user select either "Use Data Type of Value Expression", or a type from a drop-down data type list. If the user selects a specific data type, any sub-property fields appear as additional rows. The user can specify different expressions and options for different sub-properties. An example use of this would be to specify a data type of "NI_IVIWave" and then specify Locals.ChanName as an expression for the "Channel" sub-property, and Locals.MaxPower as an expression for the "Data" sub-property, while either leaving the other sub-properties with their default values or using the "Exclude from Results" option to specify that they are not logged.

The "Filter" column lets the user specify an optional expression that if present, must evaluate to True for the item to be logged.

The graphical user interface of FIG. 7 also includes check box options in the right-most column which the user can check or un-check to set various options for each row. The header icon for each option has a tool tip that identifies it. From left to right, the options are: "Include in Report", "Is Measurement", "Is Limit", and "Exclude from Results". The "Include in Report" option specifies whether to log the item in a report file (i.e., whether to later transfer the item from the results data structure to the report file) and is set by default. The "Include in Report", "Is Measurement", and "Is Limit" options may apply recursively. If one of these options is set for a property, it may also appear set for and its sub-properties. Setting the "Exclude From Results" option causes the item to be excluded from the results data structure and disables all other options and columns. It also dims or hides any sub-property rows.

In other embodiments the graphical user interface may allow the user to specify other information for each expression entered. For example, in one embodiment the graphical user interface may include an additional column where the user can specify a display name. For example, when the step is executed during execution of the test executive sequence, the result value of the expression may be logged to a report file, and the display name may be included along with the result value to allow the user to easily interpret the report file.

In one embodiment, the sequence editor 212 may enable the user to configure one or more expressions to be logged for a step that calls a user-supplied code module. As described below, when the step is executed during execution of the test executive sequence, in addition to invoking the user-supplied code module for execution, the test executive engine 220 may also evaluate and log the one or more expressions. Thus, in addition to the functionality implemented by the user-supplied code module being performed, the expression(s) configured for the step may also be logged when the step is executed. In one embodiment the user may be able to specify whether the one or more expressions are to be evaluated before or after the user-supplied code module is invoked for execution.

In another embodiment the sequence editor 212 may provide a special step type referred to herein as a result logging step for the purpose of logging expressions. The user may include a result logging step in the test executive sequence and configure one or more expressions for the result logging step, similarly as described above. In one embodiment the result logging step may not call a user-supplied code module. Thus, the main purpose of the result logging step is to evaluate and log one or more expressions. The result logging step may appear as a separate step in the test executive sequence such that the user can easily recognize its purpose. When the result logging step is executed during execution of the test executive sequence, the test executive engine 220 may evaluate and log the expression(s) configured for the result logging step without calling a user-supplied code module to perform other functionality.

Figure 8:
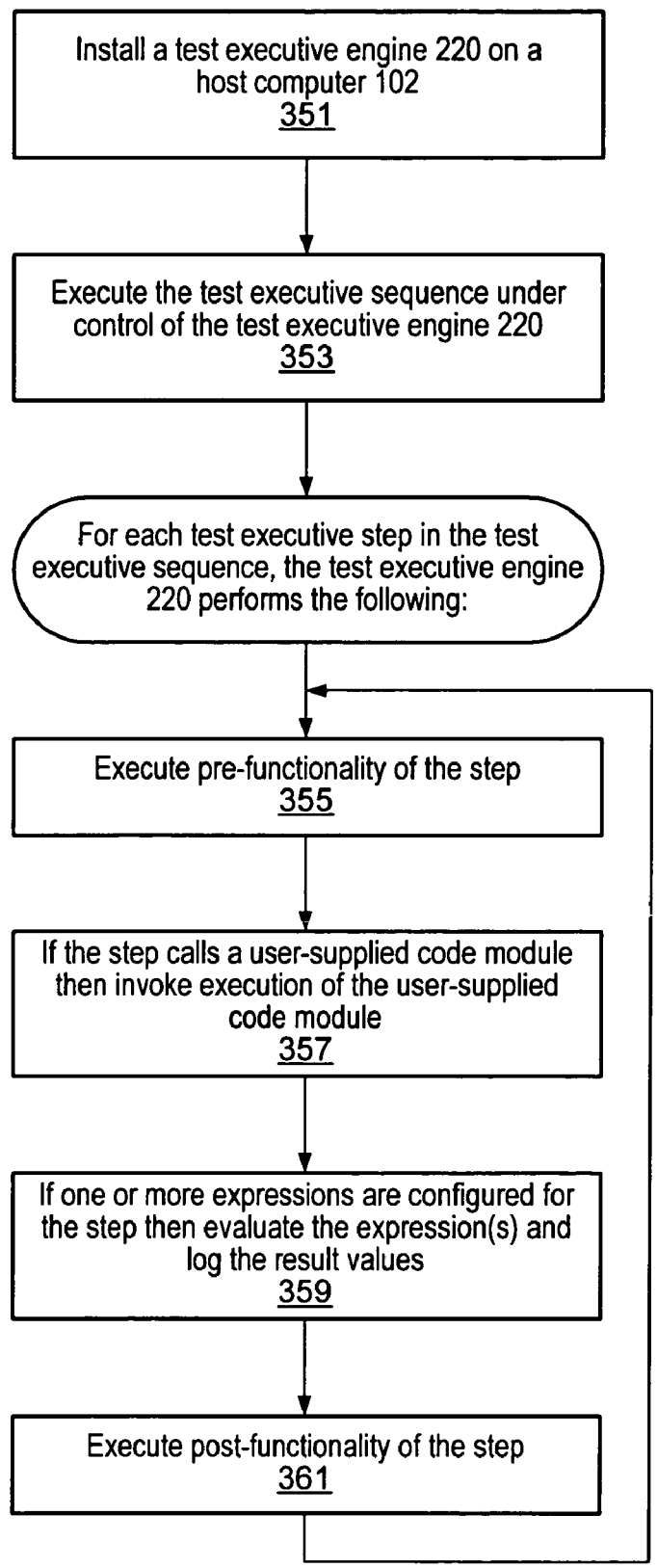
FIG. 8 is a flowchart diagram illustrating one embodiment of a method for executing a test executive sequence, where one or more expressions to be logged have been configured for one or more steps in the test executive sequence.

FIG. 8—Executing a Test Executive Sequence with Expressions to be Logged

Once the user has created a test executive sequence and configured one or more expressions for one or more steps in the test executive sequence as described above with reference to FIG. 6, the test executive sequence may be executed. FIG. 8 is a flowchart diagram illustrating one embodiment of a method for executing a test executive sequence, where one or more expressions to be logged have been configured for one or more steps in the test executive sequence. It is noted that FIG. 8 illustrates a representative embodiment, and alternative embodiments are contemplated. Also, various elements may be combined, omitted, or performed in different orders.

In 351, a test executive engine 220 may be installed on a host computer 102. Installing the test executive engine 220 on the computer system may include enabling the computer system to execute the test executive engine 220. For example, one or more executable files associated with the test executive engine 220 or providing access to the test executive engine 220 may be installed on the host computer 102. The host computer 102 on which the test executive engine 220 is installed may be the same as the host computer on which the sequence editor 212 is installed in 301 of FIG. 6 or may be a different host computer. For example, in one embodiment the test executive sequence may be created by the sequence editor 212 and executed by the test executive engine 220 on the same computer system. In another embodiment the test executive sequence may be created by the sequence editor 212 on a first computer system and executed by the test executive engine 220 on a different computer system.

In 353, the test executive sequence may be executed under control of the test executive engine 220. Executing the test executive sequence may comprise executing each of the steps in the test executive sequence, e.g., executing the steps according to an order defined by the test executive sequence. In various embodiments the test executive sequence may be executed to perform any of various kinds of tests on a unit under test (UUT) or process 150. For example, as described above with reference to FIG. 1, the host computer 102 may couple to one or more instruments, and various test executive steps in the test executive sequence may call user-supplied code modules that are operable to connect through the one or more instruments to analyze, measure, or control the unit under test (UUT) or process 150.

FIG. 8 indicates several operations that the test executive engine 220 may perform when executing each test executive step in the test executive sequence. As described above, in one embodiment the step may have "pre-functionality" that is implemented by the test executive engine 220, i.e., functionality to be performed before a user-supplied code module called by the step is executed. In 355 the test executive engine 220 may execute the pre-functionality of the step. In another embodiment the step may not have pre-functionality, and 355 may not be performed.

If the step was configured to call a user-supplied code module in 305 of FIG. 6 then in 357 the test executive engine 220 may invoke execution of the user-supplied code module. In various embodiments the user-supplied code module may be invoked for execution using any of various techniques, e.g., depending on the type or implementation of the user-supplied code module. For example, where the user-supplied code module comprises a function in a DLL, the test executive engine 220 may call the function. As another example, where the user-supplied code module comprises a method of an ActiveX object, the test executive engine 220 may invoke the method. As another example, where the user-supplied code module comprises a graphical program, the test executive engine 220 may invoke execution of the graphical program. In other embodiments the test executive engine 220 may perform any of various other actions to invoke execution of the user-supplied code module, depending on the implementation of the module.

Depending on the implementation or type of the user-supplied code module, in one embodiment the module may be executed in an execution environment or an execution subsystem that is separate from the test executive engine 220. For example, where the user-supplied code module comprises a graphical program, the module may be executed by an execution subsystem of a graphical programming system. As another example, where the user-supplied code module comprises a Java™ module, the module may be executed within a Java™ execution environment. In one embodiment the user-supplied code module may be executed in a different process other than the process in which the test executive engine 220 executes.

The user-supplied code module called by the test executive step may execute to perform any functionality. In one embodiment the user-supplied code module may perform a test of a UUT, e.g., by interacting with one or more hardware devices or instruments to test the UUT. In one embodiment the user-supplied code module may produce data or execution results and may store the data or execution results such that it is accessible to the test executive engine 220. For example, in one embodiment the user-supplied code module may store data in one or more variables or properties that are defined by the test executive sequence or accessible to the test executive engine 220.

Referring again to FIG. 8, if one or more expressions were configured for the test executive step in 307 of FIG. 6, then the test executive engine 220 may evaluate the expression(s) and may log the result values of the expression(s). As described above with reference to FIG. 6, the expression(s) may include variables or properties defined by the test executive sequence or accessible to the test executive engine 220. In one embodiment, the expression(s) may reference variables or properties that are written into by one or more user-supplied code modules, e.g., either the user-supplied code module called by this step (if the step calls a user-supplied code module) or user-supplied code modules called by previous steps. For example, the expression(s) may reference variables or properties containing execution results of the user-supplied code modules.

As described above with reference to FIG. 6, the expression(s) configured for the step may be evaluated to produce result data of any kind. For example, in one embodiment the result data may comprise a scalar value having any of various data types, such as an integer value, floating point value, Boolean value, etc. In another embodiment the result data may comprise more complex values. For example, the result data may comprise an array, where the array may include values that have any of various data types. As another example, the result data may comprise a structure, record, container, or other complex data type.

Logging the result values of the one or more expressions configured for the step may comprise storing the result values. In one embodiment the result values may be stored on non-volatile memory, such as a hard disk or other memory medium coupled to the host computer system 102. For example, in one embodiment the result values may be stored in a report file for the test executive sequence. In another embodiment the result values may be stored in a database.

As described above, in one embodiment the step may have "post-functionality" that is implemented by the test executive engine 220, i.e., functionality to be performed after the user-supplied code module called by the step is executed. In 361 the test executive engine 220 may execute the post-functionality of the step. In another embodiment the step may not have post-functionality, and 361 may not be performed.

It is noted that the functionality of logging the result values of the expression(s) configured for the step may be performed at various times or in various orders with respect to the other elements indicated in FIG. 8. In one embodiment, for each step for which one or more expressions are configured, the result values of the one or more expressions may be logged at the time the step is executed. For example, if the result values of the one or more expressions are to be logged to a file or database then the result values may be stored in the file or database at the time the step is executed. For example, the test executive engine 220 may store the result values of the expressions configured for the step in the file or database before continuing to execute other steps in the test executive sequence.

In another embodiment the expressions configured for various steps in the test executive sequence may not necessarily be logged to non-volatile memory when the respective steps are executed. For example, when a step is executed, the result values of the expressions configured for the step may be temporarily stored in a data structure in memory of the host computer 102, such as the results data structure described above. The expression result values may later be logged by transferring them from the temporary data structure to a file or database located on a hard disk or other non-volatile memory medium. For example, in one embodiment the test executive engine 220 may transfer all the expression result values for all the steps in the test executive sequence from the temporary data structure to the file or database at the end of the test executive sequence execution, e.g., after all the steps in the test executive sequence have been executed.

It is also noted that in 359 the one or more expressions configured for the step may be evaluated before and/or after the user-supplied code module called by the step is invoked for execution in 357. For example, in some cases it may be desirable to evaluate an expression before the user-supplied code module is invoked for execution. For example, the user-supplied code module may execute to change the value of a variable, and it may be desirable to log the value of the variable before the user-supplied code module is executed. In other cases it may be desirable to evaluate an expression after the user-supplied code module called by the step is invoked for execution. For example, where the user-supplied code module executes to change the value of a variable, it may be desirable to log the variable value set by the user-supplied code module.

In one embodiment the user may be able to specify whether he desires an expression configured for a step to be evaluated before the user-supplied code module called by the step is invoked for execution and/or after the user-supplied code module finishes execution. For example, when the user configures the expression for the step in 307 of FIG. 6, the sequence editor 212 may display a graphical user interface that allows the user to specify options affecting when the expression is evaluated relative to execution of the user-supplied code module.

It is noted that evaluating an expression and/or logging the result value of the expression before the user-supplied code module is invoked for execution may be viewed as part of the pre-functionality of the step. Evaluating an expression and/or logging the result value of the expression after the user-supplied code module is executed may be viewed as part of the post-functionality of the step.

In another embodiment, a step for which one or more expressions are configured to be logged may not call a user-supplied code module. For example, as described above, the user may include a specialized result logging step in the test executive sequence and configure one or more expressions for the result logging step. Thus, the test executive engine 220 may evaluate and log the expression(s) configured for the result logging step without calling a user-supplied code module when the result logging step is executed.

The above-described method may simplify the user's task of developing a test executive sequence to test a UUT and logging test results or other execution results of the test executive sequence. The user may configure one or more expressions for one or more steps of the test executive sequence to be automatically logged without having to do any programming to implement the logging, other than simply specifying the expressions themselves. For example, as described above, the user may simply interact with a graphical user interface of the sequence editor 212 to specify the expressions to be logged, and the test executive engine 220 may automatically evaluate the expressions and log their result values when the test executive sequence is executed. The graphical user interface may allow the user to easily configure any number of expressions to log, where the expressions evaluate to data having any of various data types.

Figure 9:
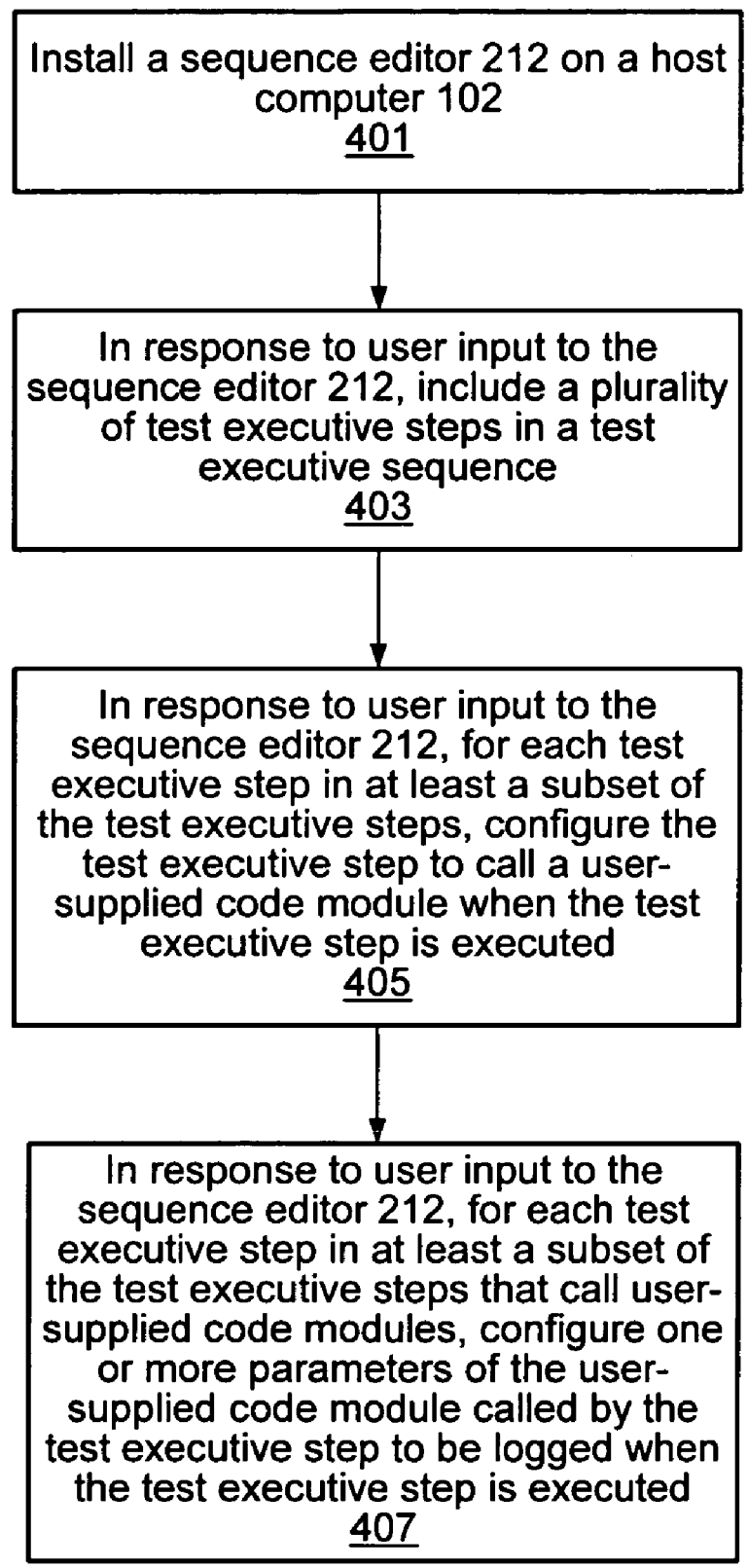
FIG. 9 is a flowchart diagram illustrating one embodiment of a method for creating a test executive sequence and configuring one or more parameters of one or more user-supplied code modules that are called by steps of the test executive sequence to be logged when the test executive sequence is executed.

FIG. 9—Configuring Parameters to Log for a Test Executive Sequence

It is often useful to log the values of input parameters that are passed to user-supplied code modules and/or log the values of output parameters that are written by user-supplied code modules during the execution of a test executive sequence. For example, logging the parameter values may enable the user to better understand the test results of the test executive sequence. FIG. 9 is a flowchart diagram illustrating one embodiment of a method for creating a test executive sequence and configuring one or more parameters of one or more user-supplied code modules that are called by steps of the test executive sequence to be logged when the test executive sequence is executed. It is noted that FIG. 9 illustrates a representative embodiment, and alternative embodiments are contemplated. Also, various elements may be combined, omitted, or performed in different orders.

In 401, a sequence editor 212 may be installed on a host computer 102, similarly as described above with reference to 301 of FIG. 6.

In 403, a test executive sequence may be created using the sequence editor 212 installed in 401. Creating the test executive sequence may comprise including a plurality of test executive steps in the test executive sequence in response to user input to the sequence editor 212, as described above. The user may also configure each of the test executive steps, e.g., by interacting with a GUI panel or dialog box for each step to set various properties or options.

In 405, at least a subset of the test executive steps in the test executive sequence may be configured to call user-supplied code modules. For example, for each step that calls a user-supplied code module, the user may interact with a GUI panel or provide other input to the sequence editor 212 to specify or select the user-supplied code module to call.

Each of the user-supplied code modules that are called by steps of the test executive sequence may take parameters of various data types. Thus, configuring a test executive step to call a user-supplied code module may also comprise specifying what to pass for each parameter of the user-supplied code module. Parameters for a user-supplied code module may include input parameters and/or output parameters. An input parameter may provide input to the user-supplied code module, and an output parameter may be written into by the user-supplied code module. For example, for each input parameter, the user may specify a variable, constant, or other data to be passed as the parameter value. When the step is executed during execution of the test executive sequence, the user-supplied code module referenced by the step may be invoked with the specified parameter values. Similarly, for each output parameter, the user may specify a memory location (e.g., a variable, property, or other memory location or address) into which the user-supplied code module can write data for the output parameter. When the step is executed during execution of the test executive sequence, the user-supplied code module referenced by the step may execute to write data into the memory locations passed for the output parameters.

In various embodiments the test executive sequence may be operable to test any of various kinds of units under test (UUT) or physical systems. For example, test executive steps in the test executive sequence may call user-supplied code modules that are operable to connect through one or more hardware devices or instruments to analyze, measure, or control a unit under test (UUT) or process 150, such as described above with reference to FIG. 1.

As indicated in 407, for each test executive step in at least a subset of the test executive steps that call user-supplied code modules, one or more parameters of the user-supplied code module called by the test executive step may be configured to be logged when the test executive step is executed. For example, the user may provide input to the sequence editor 212 to select or specify one or more parameters of one or more user-supplied code modules called by steps in the test executive sequence, and the sequence editor 212 may configure the parameters selected by the user to be logged.

As described below, for each test executive step that calls a user-supplied code module for which one or more parameters are configured to be logged, the one or more parameters may be logged or stored when the test executive step is executed during execution of the test executive sequence. For example, input parameters may be logged by storing the actual parameter values passed to the user-supplied code module, e.g., in a file or database. Output parameters may be logged by storing the data written into the parameter locations by the user-supplied code module. As described below, the test executive sequence may be executed under control of a test executive engine 220, and the test executive engine 220 may be operable to log the parameters that are configured to be logged for the various user-supplied code modules called by steps of the test executive sequence.

In one embodiment, for each step that calls a user-supplied code module for which the user desires to log one or more parameters, the user may interact with a graphical user interface of the sequence editor 212 to select the one or more parameters to be logged. For example, the sequence editor 212 may display a graphical user interface that visually indicates each parameter of the user-supplied code module and allows the user to select the parameter(s) which the user desires to be logged. In one embodiment the graphical user interface may visually indicate information such as the name of each parameter, the data type of each parameter, the value or memory location passed for the parameter, etc.

FIG. 10 illustrates one exemplary embodiment of a graphical user interface with which the user may interact to configure one or more parameters of a user-supplied code module to be logged. The parameter name of each parameter of the user-supplied code module is listed under the "Name" column. In the example of FIG. 10, the user-supplied code module has three parameters: "Sequence Context", "Report Text", and "error out". The "error out" parameter is of a Container data type, and has three sub-fields: "status", "code", and "source".

The data type of each parameter is listed under the "Type" column.

The "In/Out" column indicates whether each parameter is an input parameter (to provide input to the user-supplied code module), an output parameter (to be written into by the user-supplied code module), or both.

The "Value" column indicates the values that are configured to be passed as the parameter values for each parameter when the user-supplied code module is called. For example, in FIG. 10, a sequence variable named "ThisContext" is configured to be passed as the parameter value for the "Sequence Context" input parameter. A variable named "Step.Result.Error" is configured to be passed as the parameter value for the "error out" output parameter. The user-supplied code module may write error data into the "Step.Result.Error" variable.

The column to the left of the "Value" column which is headed by an icon includes check boxes for each parameter of the user-supplied code module. The user may check the check box for each parameter that he wants to be logged. For example, if the user checks the check box for the "Sequence Context" input parameter then the value of the "ThisContext" variable that is passed to the user-supplied code module as the value for the "Sequence Context" input parameter may be logged during execution of the test executive sequence, as described below. Similarly, if the user checks the check box for the "error out" output parameter then the value of the "Step.Result.Error" variable that is written by the user-supplied code module may be logged during execution of the test executive sequence.

As described above with reference to FIGS. 6-8, in one embodiment, one or more expressions may be configured for a test executive step such that the one or more expressions are logged when the step is executed during execution of the test executive sequence. In one embodiment, this method of configuring expressions for a step may be used to configure parameters to be logged. For example, for each parameter that the user selects to be logged for a user-supplied code module called by a test executive step, the sequence editor 212 may automatically add an expression corresponding to the parameter to the list of expressions configured for the step. The expression may simply comprise the value that is configured to be passed as the parameter value to the user-supplied code module. For example, in FIG. 10, if the user selects the "Sequence Context" parameter to be logged, then a "ThisContext" expression may be automatically added to the list of expressions configured for the step. Thus, the expression may evaluate to the value of the "ThisContext" variable, which is passed as the value for the "Sequence Context" parameter, and the variable value may be logged when the expressions for the step are evaluated, as described above.

In another embodiment, the parameter logging may not utilize the expression logging method described above.

Figure 11:
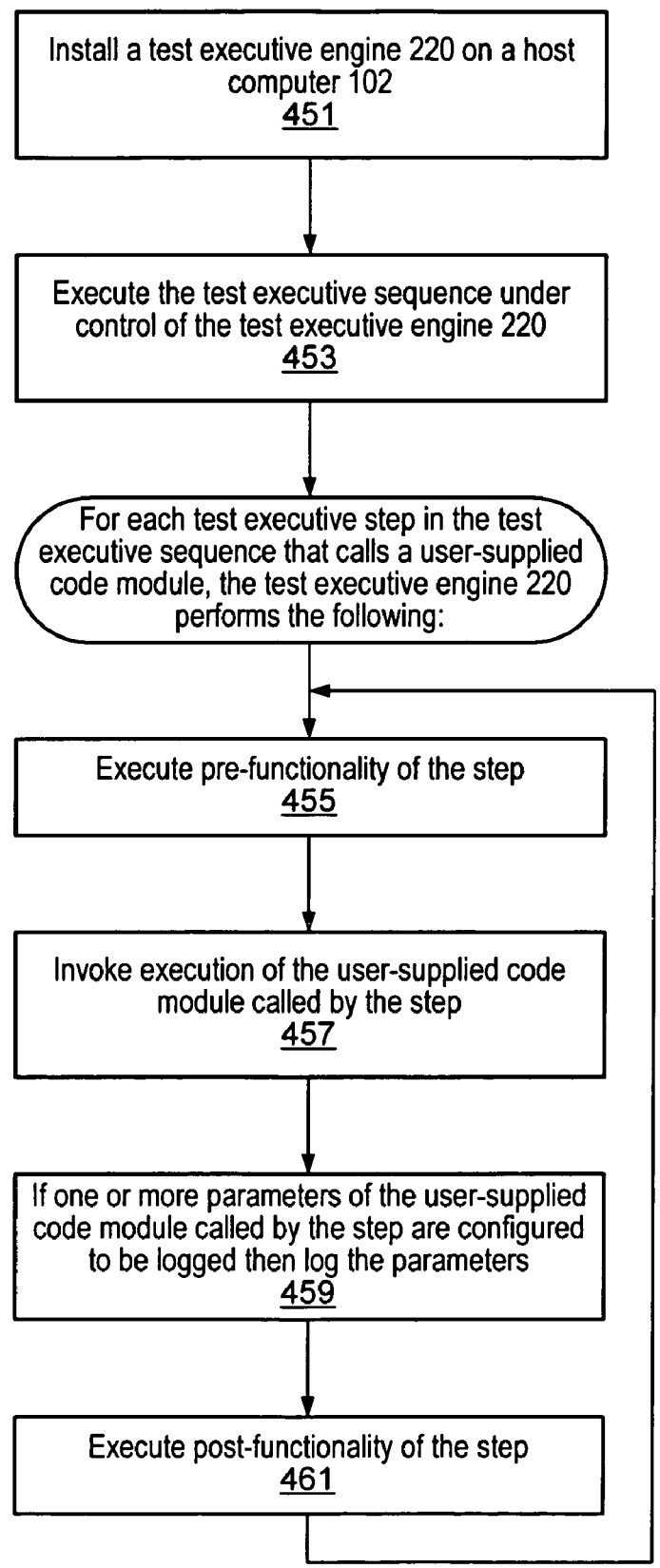
FIG. 11 is a flowchart diagram illustrating one embodiment of a method for executing a test executive sequence, where one or more parameters to be logged have been configured for one or more steps in the test executive sequence.

FIG. 11—Executing a Test Executive Sequence with Parameters to be Logged

Once the user has created a test executive sequence and configured one or more parameters of one or more user-supplied code modules that are called by steps of the test executive sequence to be logged as described above with reference to FIG. 9, the test executive sequence may be executed. FIG. 11 is a flowchart diagram illustrating one embodiment of a method for executing a test executive sequence, where one or more parameters to be logged have been configured for one or more steps in the test executive sequence. It is noted that FIG. 11 illustrates a representative embodiment, and alternative embodiments are contemplated. Also, various elements may be combined, omitted, or performed in different orders.

In 451, a test executive engine 220 may be installed on a host computer 102. Installing the test executive engine 220 on the computer system may include enabling the computer system to execute the test executive engine 220. For example, one or more executable files associated with the test executive engine 220 or providing access to the test executive engine 220 may be installed on the host computer 102. The host computer 102 on which the test executive engine 220 is installed may be the same as the host computer on which the sequence editor 212 is installed in 401 of FIG. 9 or may be a different host computer. For example, in one embodiment the test executive sequence may be created by the sequence editor 212 and executed by the test executive engine 220 on the same computer system. In another embodiment the test executive sequence may be created by the sequence editor 212 on a first computer system and executed by the test executive engine 220 on a different computer system.

In 453, the test executive sequence may be executed under control of the test executive engine 220. Executing the test executive sequence may comprise executing each of the steps in the test executive sequence, e.g., executing the steps according to an order defined by the test executive sequence. In various embodiments the test executive sequence may be executed to perform any of various kinds of tests on a unit under test (UUT) or process 150. For example, as described above with reference to FIG. 1, the host computer 102 may couple to one or more instruments, and various test executive steps in the test executive sequence may call user-supplied code modules that are operable to connect through the one or more instruments to analyze, measure, or control the unit under test (UUT) or process 150.

FIG. 11 indicates several operations that the test executive engine 220 may perform when executing each test executive step in the test executive sequence that calls a user-supplied code module. As described above, in one embodiment the step may have "pre-functionality" that is implemented by the test executive engine 220, i.e., functionality to be performed before the user-supplied code module called by the step is executed. In 455 the test executive engine 220 may execute the pre-functionality of the step. In another embodiment the step may not have pre-functionality, and 455 may not be performed.

In 457 the test executive engine 220 may invoke execution of the user-supplied code module called by the test executive step. As described above, the user-supplied code module may take one or more parameters, and when the test executive sequence is created in the sequence editor 212, the user may specify the parameters to pass to the user-supplied code module. Thus, invoking execution of the user-supplied code module called by the test executive step in 457 may comprise passing the specified parameters to the user-supplied code module.

For example, the user-supplied code module may take one or more input parameters. When the user-supplied code module is invoked, a parameter value for each input parameter may be passed to the user-supplied code module. For example, the user may have specified a variable, property, constant, or other data to pass for each input parameter. In one embodiment a variable or property that is defined by the test executive sequence may be passed as an input parameter to the user-supplied code module. For example, the sequence editor 212 may allow the user to define variables for the test executive sequence or define properties for the step that calls the user-supplied code module.

The user-supplied code module may also, or may alternatively, take one or more output parameters. When the user-supplied code module is invoked, a memory location or address for each output parameter may be passed to the user-supplied code module. For example, the user may have specified a variable, property, or other memory location into which the user-supplied code module can write data for each output parameter. In one embodiment a variable or property that is defined by the test executive sequence may be passed as an output parameter to the user-supplied code module.

In various embodiments the user-supplied code module may be invoked for execution using any of various techniques, e.g., depending on the type or implementation of the user-supplied code module. For example, where the user-supplied code module comprises a function in a DLL, the test executive engine 220 may call the function. As another example, where the user-supplied code module comprises a method of an ActiveX object, the test executive engine 220 may invoke the method. As another example, where the user-supplied code module comprises a graphical program, the test executive engine 220 may invoke execution of the graphical program. In other embodiments the test executive engine 220 may perform any of various other actions to invoke execution of the user-supplied code module, depending on the implementation of the module.

Depending on the implementation or type of the user-supplied code module, in one embodiment the module may be executed in an execution environment or an execution subsystem that is separate from the test executive engine 220. For example, where the user-supplied code module comprises a graphical program, the module may be executed by an execution subsystem of a graphical programming system. As another example, where the user-supplied code module comprises a Java™ module, the module may be executed within a Java™ execution environment. In one embodiment the user-supplied code module may be executed in a different process other than the process in which the test executive engine 220 executes.

The user-supplied code module called by the test executive step may execute to perform any functionality. In one embodiment the user-supplied code module may perform a test of a UUT, e.g., by interacting with one or more hardware devices or instruments to test the UUT. For example, the test executive engine 220 may pass one or more input parameters to the user-supplied code module which the user-supplied code module utilizes in testing the UUT, and/or the user-supplied code module may write data indicating results of testing the UUT into an output parameter passed by the test executive engine 220.

As indicated in 459 of FIG. 11, if one or more parameters of the user-supplied code module called by the step are configured to be logged (i.e., were configured to be logged in 407 of FIG. 9) then the test executive engine 220 may log the one or more parameters. Logging the one or more parameters may comprise storing the one or more parameters so that they can later be reviewed by a user. In one embodiment the one or more parameters may be stored on non-volatile memory, such as a hard disk or other memory medium coupled to the host computer system 102. For example, in one embodiment the one or more parameters may be stored in or written into a file, e.g., a report file for the test executive sequence. In another embodiment the one or more parameters may be stored in a database.

Logging an input parameter may comprise storing the actual parameter value passed for the input parameter to the user-supplied code module. For example, if a variable is passed as the input parameter then the value of the variable may be stored. Similarly, if a constant is passed as the input parameter then the constant may be stored.

Logging an output parameter may comprise storing the data written into the output parameter by the user-supplied code module. For example, if a variable or property is passed as the output parameter then the value of the variable or property may be stored after data has been written into the variable or property by the user-supplied code module.

Logging a parameter in a file may comprise the test executive engine 220 writing text data and/or binary data in the file to represent the value of the parameter. For example, in one embodiment the test executive engine 220 may write text data into a report file so that the parameter value is readable by a user. The report file may be formatted to include information indicating the step and/or the user-supplied code module with which the parameter is associated, the parameter name, the parameter value passed to the user-supplied code module and/or written by the user-supplied code module, etc.

Parameters passed to or written into by the user-supplied code module may have any of various data types. The test executive engine 220 may be operable to log or store the parameters appropriately for each data type. For example, the test executive engine 220 may be operable to log parameters having various scalar data types (e.g., integers, floating points, Booleans, etc.). The test executive engine 220 may also be operable to log parameters having array data types that include a plurality of similar elements. The test executive engine 220 may also be operable to log parameters having array data types that encapsulate multiple elements that may each have different data types, such as structures, records, or containers. The test executive engine 220 may also be operable to log parameters having other complex data types as well.

As described above, in one embodiment the step may have "post-functionality" that is implemented by the test executive engine 220, i.e., functionality to be performed after the user-supplied code module called by the step is executed. In 461 the test executive engine 220 may execute the post-functionality of the step. In another embodiment the step may not have post-functionality, and 461 may not be performed.

It is noted that the functionality of logging the one or more parameters in 459 may be performed at various times or in various orders with respect to the other elements indicated in FIG. 11. In one embodiment, for each step that calls a user-supplied code module for which one or more parameters are configured to be logged, the one or more parameters may be logged at the time the step is executed. For example, if the one or more parameters are to be logged to a file or database then the parameters may be stored in the file or database at the time the step is executed. For example, the test executive engine 220 may store the parameters for the step in the file or database before continuing to execute other steps in the test executive sequence.

In another embodiment the parameters configured to be logged for various steps in the test executive sequence may not necessarily be logged when the respective steps are executed. For example, when a step is executed, the parameters configured to be logged for the user-supplied code module called by the step may be temporarily stored in a data structure in memory of the host computer 102. The parameters may later be logged by transferring them from the temporary data structure to a file or database located on a hard disk or other non-volatile memory medium. For example, in one embodiment the test executive engine 220 may transfer all the parameters to be logged for all the steps in the test executive sequence from the temporary data structure to the file or database at the end of the test executive sequence execution, e.g., after all the steps in the test executive sequence have been executed.

It is also noted that in 459 the one or more parameters for the user-supplied code module called by the step may be logged or may be temporarily stored in a data structure before and/or after the user-supplied code module is invoked for execution in 457. For example, output parameters may be logged after the user-supplied code module finishes executing so that the user-supplied code module is able to write data into them before they are logged. Input parameters may be logged either before or after the user-supplied code module executes. Logging parameters before the user-supplied code module is invoked for execution may be viewed as part of the pre-functionality of the step. Logging parameters after the user-supplied code module is executed may be viewed as part of the post-functionality of the step.

The above-described method may simplify the user's task of developing a test executive sequence to test a UUT and evaluating test results of the test executive sequence. The user may configure one or more parameters of one or more user-supplied code modules called by steps of the test executive sequence to be automatically logged without having to do any programming to implement the logging. For example, as described above, the user may simply interact with a graphical user interface of the sequence editor 212 to select the parameters to be logged, and the test executive engine 220 may automatically log the selected parameters when the test executive sequence is executed.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium storing program instructions executable to:
   include a plurality of test executive steps in a test executive sequence in response to user input, wherein the plurality of test executive steps includes a first test executive step;
   configure each of the test executive steps to call a user-supplied code module in response to user input, wherein the first test executive step is configured to call a first user-supplied code module that takes a first input parameter;
   configure one or more expressions for the first test executive step in response to user input, wherein each expression evaluates to a result value to be stored when the first test executive step is executed, wherein the one or more expressions include a first expression that includes the first input parameter for the first user-supplied code module;
   execute the test executive sequence, wherein said executing comprises executing each of the test executive steps in the test executive sequence, wherein executing the first test executive step comprises;
      invoking execution of the first user-supplied code module called by the first test executive step, wherein invoking execution of the first user-supplied code module includes passing a first value for the first input parameter to the first user-supplied code module;
      evaluating the first expression configured for the first test executive step, wherein the first expression evaluates to a second value based on the first value passed for the first input parameter; and
      storing the second value in response to evaluating the first expression.

2. The memory medium of claim 1,
wherein no user programming is required to implement said evaluating the first expression configured for the first test executive step and said storing the second value.

3. The memory medium of claim 1,
wherein storing the second value comprises storing the second value in one or more of a file and/or a database.

4. The memory medium of claim 1,
wherein storing the second value comprises storing the second value in a data structure.

5. The memory medium of claim 1,
wherein storing the second value comprises logging the second value in an execution report for the test executive sequence.

6. The memory medium of claim 1,
wherein evaluating the first expression configured for the first test executive step is performed before said invoking execution of the first user-supplied code module called by the first test executive step.

7. The memory medium of claim 1, wherein evaluating the first expression configured for the first test executive step is performed after said invoking execution of the first user-supplied code module called by the first test executive step.

8. The memory medium of claim 1, wherein the first test executive step has pre-functionality, wherein the pre-functionality comprises functionality to be performed before invoking execution of the first user-supplied code module called by the first test executive step; wherein executing the first test executive step further comprises executing the pre-functionality of the first test executive step before invoking execution of the first user-supplied code module called by the first test executive step.

9. The memory medium of claim 1, wherein the first test executive step has post-functionality, wherein the post-functionality comprises functionality to be performed after the first user-supplied code module called by the first test executive step finishes executing; wherein executing the first test executive step further comprises executing the post-functionality of the first test executive step after the first user-supplied code module called by the first test executive step finishes executing.

10. The memory medium of claim 1, wherein said executing the test executive sequence comprises executing the test executive sequence under control of a test executive engine; wherein the test executive engine is operable to perform said invoking execution of the first user-supplied code module called by the first test executive step, said evaluating the first expression configured for the first test executive step, and said storing the second value.

11. The memory medium of claim 1, wherein said invoking execution of the first user-supplied code module called by the first test executive step comprises one of:
   calling a function in a DLL;
   invoking a method of an ActiveX object; or
   invoking execution of a graphical program.

12. The memory medium of claim 1, wherein configuring the one or more expressions for the first test executive step requires no user programming.

13. The memory medium of claim 1, wherein the program instructions are further executable to:
   display a graphical user interface specialized for configuring expressions for the first test executive step, wherein the one or more expressions configured for the first test executive step are configured in response to user input to the graphical user interface to specify the one or more expressions.

14. The memory medium of claim 1, wherein the program instructions are further executable to display a graphical user interface for creating the test executive sequence;
   wherein said including the plurality of test executive steps in the test executive sequence is performed in response to user input received to the graphical user interface requesting inclusion of the test executive steps in the test executive sequence.

15. The memory medium of claim 1, wherein the first user-supplied code module also takes a first output parameter;
   wherein configuring the one or more expressions for the first test executive step further comprises configuring a second expression that includes the first output parameter for the first user-supplied code module;
   wherein invoking execution of the first user-supplied code module called by the first test executive step includes passing the first output parameter to the first user-supplied code module, wherein the first user-supplied code module is operable to write a third value into the first output parameter;
   wherein the program instructions are further executable to:
      evaluate the second expression configured for the first test executive step, wherein the second expression evaluates to a fourth value based on the third value written into the first output parameter; and
      store the fourth value in response to evaluating the second expression.

16. The memory medium of claim 15, wherein said passing the first output parameter to the first user-supplied code module comprises passing a first memory location to the first user-supplied code module, wherein said first user-supplied code module writing the third value into the first output parameter comprises the first user-supplied code module writing data into the first memory location;
   wherein the second expression evaluates to the fourth value based on the data written into the first memory location by the first user-supplied code module.

17. A method comprising:
   including a plurality of test executive steps in a test executive sequence in response to user input, wherein the plurality of test executive steps includes a first test executive step;
   configuring each of the test executive steps to call a user-supplied code module in response to user input, wherein the first test executive step is configured to call a first user-supplied code module that takes a first input parameter;
   configuring one or more expressions for the first test executive step in response to user input, wherein each expression evaluates to a result value to be stored when the first test executive step is executed, wherein the one or more expressions include a first expression that includes the first input parameter for the first user-supplied code module;
   executing the test executive sequence, wherein said executing comprises executing each of the test executive steps in the test executive sequence, wherein executing the first test executive step comprises:
      invoking execution of the first user-supplied code module called by the first test executive step, wherein invoking execution of the first user-supplied code module includes passing a first value for the first input parameter to the first user-supplied code module;
      evaluating the first expression configured for the first test executive step, wherein the first expression evaluates to a second value based on the first value passed for the first input parameter; and
      storing the second value in response to evaluating the first expression.

18. The method of claim 17, wherein storing the step second value comprises storing the second value in one or more of a file and/or a database.

19. The method of claim 17, wherein storing the second value comprises storing the second value in a data structure.

20. The method of claim 17, wherein the program instructions are further executable to:

display a graphical user interface specialized for configuring expressions for the first test executive step, wherein the one or more expressions configured for the first test executive step are configured in response to user input to the graphical user interface to specify the one or more expressions.

21. The method of claim 17, wherein the program instructions are further executable to display a graphical user interface for creating the test executive sequence;

wherein said including the plurality of test executive steps in the test executive sequence is performed in response to user input received to the graphical user interface requesting inclusion of the test executive steps in the test executive sequence.

22. The method of claim 17, wherein the first user-supplied code module also takes a first output parameter;

wherein configuring the one or more expressions for the first test executive step further comprises configuring a second expression that includes the first output parameter for the first user-supplied code module;

wherein invoking execution of the first user-supplied code module called by the first test executive step includes passing the first output parameter to the first user-supplied code module, wherein the first user-supplied code module is operable to write a third value into the first output parameter;

wherein the method farther comprises:

evaluating the second expression configured for the first test executive step, wherein the second expression evaluates to a fourth value based on the third value written into the first output parameter; and storing the fourth value in response to evaluating the second expression.

23. A system comprising:

one or more processors; and memory storing program instructions;

wherein the program instructions are executable by the one or more processors to:

include a plurality of test executive steps in a test executive sequence in response to user input, wherein the plurality of test executive steps includes a first test executive step;

configure each of the test executive steps to call a user-supplied code module in response to user input, wherein the first test executive step is configured to call a first user-supplied code module that takes a first input parameter;

configure one or more expressions for the first test executive step in response to user input, wherein each expression evaluates to a result value to be stored when the first test executive step is executed, wherein the one or more expressions include a first expression that includes the first input parameter for the first user-supplied code module;

execute the test executive sequence, wherein said executing comprises executing each of the test executive steps in the test executive sequence, wherein executing the first test executive step comprises:

invoking execution of the first user-supplied code module called by the first test executive step, wherein invoking execution of the first user-supplied code module includes passing a first value for the first input parameter to the first user-supplied code module;

evaluating the first expression configured for the first test executive step, wherein the first expression evaluates to a second value based on the first value passed for the first input parameter; and storing the second value in response to evaluating the first expression.

24. The system of claim 23, wherein the first user-supplied code module also takes a first output parameter;

wherein configuring the one or more expressions for the first test executive step further comprises configuring a second expression that includes the first output parameter for the first user-supplied code module;

wherein invoking execution of the first user-supplied code module called by the first test executive step includes passing the first output parameter to the first user-supplied code module, wherein the first user-supplied code module is operable to write a third value into the first output parameter;

wherein the program instructions are further executable by the one or more processors to:

evaluate the second expression configured for the first test executive step, wherein the second expression evaluates to a fourth value based on the third value written into the first output parameter; and store the fourth value in response to evaluating the second expression.

* * * * *

UNITED STATES PATENT AND TRADEMARK OFFICE
Certificate

Patent No. 7,451,358 B2                                                                 Patented: November 11, 2008

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: James A. Grey, Austin, TX (US); Hjalmar Perez, Austin, TX (US); and James J. Reumuth, Austin, TX (US).

Signed and Sealed this Sixth Day of May 2014.

SCOTT BADERMAN
*Supervisory Patent Examiner*
Art Unit 2114
Technology Center 2100